United States Patent [19]

Weishaupt et al.

[11] Patent Number: 4,916,966
[45] Date of Patent: Apr. 17, 1990

[54] TRANSMISSION SHIFT VIBRATION DAMPER

[75] Inventors: James F. Weishaupt; Loren W. Stevens, both of Jackson, Mich.

[73] Assignee: Dawlen Corporation, Jackson, Mich.

[21] Appl. No.: 267,322

[22] Filed: Nov. 4, 1988

[51] Int. Cl.⁴ ............... F16H 57/06; G05G 9/12
[52] U.S. Cl. .................. 74/473 P; 403/131; 403/114
[58] Field of Search ............ 74/473 P, 473 R; 403/114, 131, 306, 300

[56] References Cited

U.S. PATENT DOCUMENTS

| 3,315,537 | 4/1967 | Keller | 74/473 P |
| 4,519,268 | 5/1985 | Oda | 74/473 P |
| 4,646,585 | 3/1987 | Strohmeyer et al. | 74/473 P X |

FOREIGN PATENT DOCUMENTS 2700239 7/1978 Fed. Rep. of Germany .... 74/473 P

Primary Examiner—Laurie K. Cranmer
Attorney, Agent, or Firm—Beaman & Beaman

[57] ABSTRACT

Shifting apparatus for power transmissions incorporating vibration damping elements whereby vibrations occurring within the transmission are substantially isolated from the shift lever extending into the vehicle cab. A homogeneous vibration isolator body is mounted to the end of a shift lever. The body includes a spherical segment bearing surface and a cylindrical bore receiving a gear shifting stem. Elastomeric vibration damping rings interposed between the stem, which is pivotally mounted on the body, and the body absorbs and isolates vibration, while metal-to-metal contact between the stem and body is possible upon maximum compression of the elastomeric elements occurring.

4 Claims, 1 Drawing Sheet

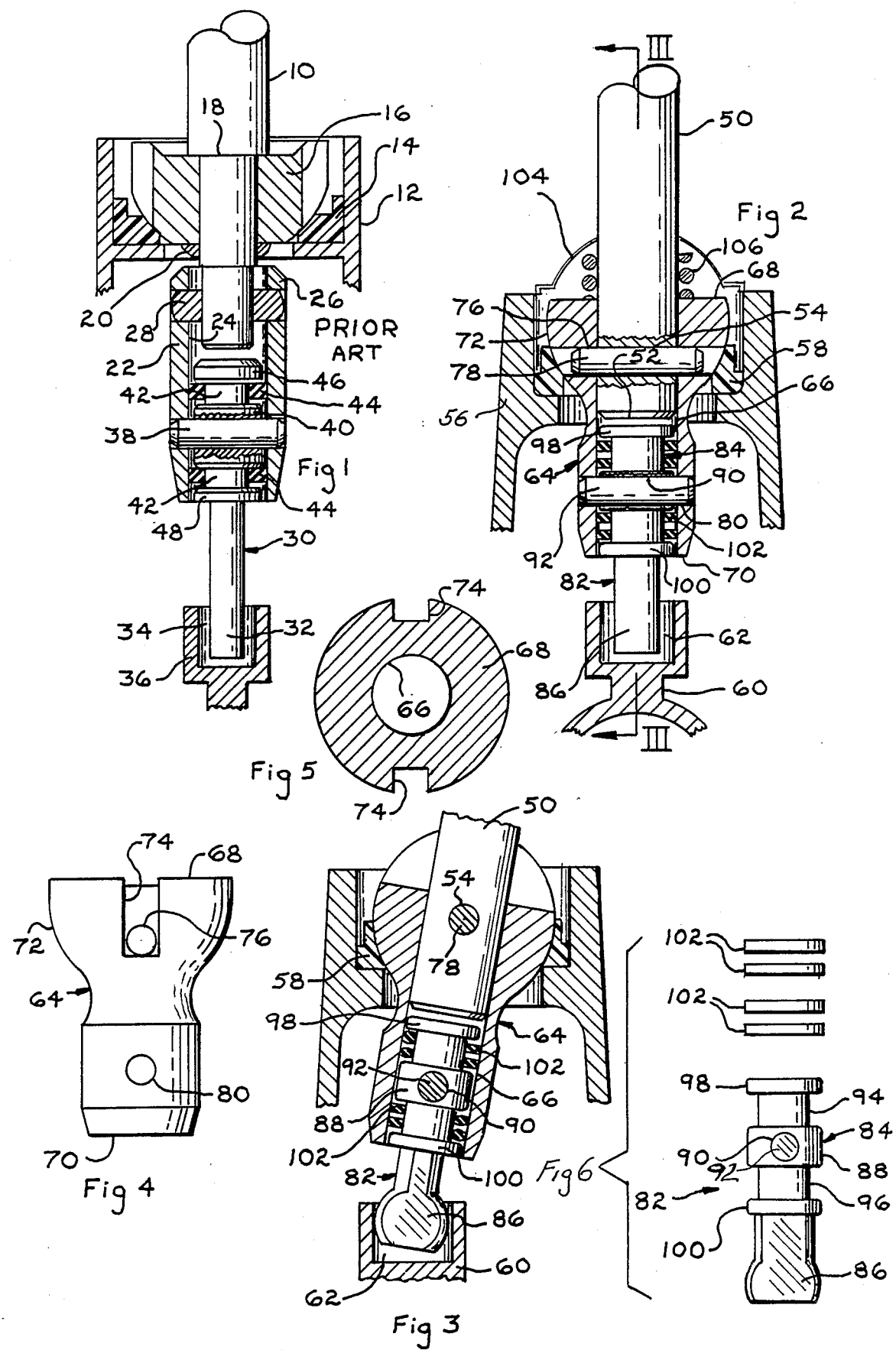

TRANSMISSION SHIFT VIBRATION DAMPER

BACKGROUND OF THE INVENTION

Manual transmissions for automobiles, trucks and the like commonly employ a shift lever located within the vehicle cab which is supported upon a spherical segment bearing for universal shift lever movement in two planes. The lower end of the shift lever is associated with an extension engaging the transmission gear operating fork or yoke. As the extension is normally rigidly associated with the shift lever vibrations occurring within the transmission due to the meshing of the gear teeth are transferred to the shift lever causing noise and distraction within the vehicle cab.

Such a transfer of the transmission vibrations to the shift lever has endeavored to be controlled by the use of vibration dampers or isolators located in the linkage system between the transmission gear shifting apparatus and the shift lever. In the past, arrangements have been employed wherein the lower end of the shift lever includes a spherical ball bearing member welded thereto, and the extension includes a separate tubular element welded to the lower end of the lever having an internal member having a lower end engaging the transmission gear operating yoke, and an upper end received within the extension bore. Vibration damping components, such as elastomeric rings, have been interposed between the stem and the extension to absorb vibrations, and while damping apparatus of this type has reduced the transfer of vibrations from the transmission to the shift lever the assembly of such components to the shift lever the welded two-part assembly has complicated the manufacture and installation of the shift lever with respect to the transmission, and added significant costs of manufacture.

It is an object of the invention to provide a transmission shift vibration damper capable of being directly mounted upon the lower end of a shift lever, and the damper includes a single homogeneous body into which the spherical bearing surface is incorporated for supporting the shift lever and the body includes a bore for receiving a yoke engaging stem and concise vibration damping elastomeric elements are imposed between the stem and the body to minimize the transmission of vibrations through the damper to the shift lever.

A further object of the invention is to provide a transmission shift vibration damper which is of a concise and readily manufacturable configuration and utilizes elastomeric rings capable of significant compression for damping the transfer of vibrations from a transmission to a shift lever.

A further object of the invention is to provide a transmission shift lever apparatus capable of absorbing the majority of vibrations transmitted thereto to prevent such vibrations from being imposed upon a shift lever, and wherein metal-to-metal contact between a gear shifting stem and the shift lever will occur under high shifting loads, and yet elastomeric elements effectively absorb vibrations under normal operating conditions.

In the practice of the invention a homogeneous and integral combination bearing-extension-vibration damper is attached to the lower end of a manually operated transmission shift lever. The damper body is of an elongated configuration having upper and lower ends, and a central bore longitudinally extends therethrough intersecting the ends.

The upper external end region of the damper body is in the form of a spherical segment ball, and a pin fixing the damper body to the shift lever permits the spherical bearing surface to support the shift lever in the transmission socket receiving the spherical bearing permitting the shift lever to be universally moved within two planes.

The lower region of the damper body extends into the vehicle transmission and the lower end receives the upper end of the gear shifting stem which is pivotally mounted within the body bore. While the lower end of the gear shifting stem is received within a groove or pocket of the transmission gear displacing yoke or hub, the upper end of the stem is pivotally connected within the body bore by a pivot pin, and as the diameter of that portion of the stem received within the body bore is less than the diameter of the body bore relative pivoting about the stem pivot pin between the stem and body is possible.

The stem end region within the body bore, both above and below the stem pivot, includes an axially extending recess receiving a pair of elastomeric rings whose outer periphery engages the body bore. Further, the stem end within the body bore includes a circular ridge of a diameter less than the body bore, and a similar ridge is located on the stem adjacent the lowermost end of the body. Thus, upon the occurrence of maximum deformation of the elastomeric rings due to a maximum pivoting occurring between the stem and damper body metal-to-metal contact between the ridges and the body bore will occur permitting high gear shafting forces to be transmitted to the transmission, if necessary.

A pair of elastomeric rings are received within each recess formed on the upper region of the stem to provide the degree of damping required, and to also give a desirable "feel" to the transmission shifting action. The axial dimension of the stem recesses is greater than the combined axial dimension of the elastomeric rings received therein wherein deformation of the rings can be accommodated without overstressing of the elastomeric material.

The unitary construction of the vibration damper body and the utilization of improved vibration damping elements, in accord with the invention, has produced an advance over the art with respect to previous developments of this type. The invention eliminates welding operations during assembly and manufacturing costs are substantially reduced.

BRIEF DESCRIPTION OF THE DRAWINGS

The aforementioned objects and advantages of the invention will be appreciated from the following description and accompanying drawings wherein:

FIG. 1 is an elevational, sectional view of a prior art transmission shift vibration damper over which the invention is an improvement, FIG. 2 is an elevational, sectional view of a transmission shift vibration damper in accord with the invention, the components being shown in a vertical vibration absorbing orientation, FIG. 3 is a view of the damper apparatus as taken along Section III—III of FIG. 1 illustrating the components in a shifting relationship wherein metal-to-metal engagement between the stem and the damper body is occurring, FIG. 4 is an elevational view of the damper body, per se, FIG. 5 is a plan view of the damper body as taken from the top of FIG. 4, and FIG. 6 is an exploded view, partially in section, of the stem components.

DESCRIPTION OF THE PREFERRED EMBODIMENT

A transmission shift vibration damper of the type peviously being manufactured by the assignee is shown in FIG. 1. In FIG. 1 a gear shift lever for a manual transmission for a vehicle, such as a truck or hard automobile, is represented at 10, only the lower portion of lever being illustrated. The upper portion of the lever includes a knob or the like, not shown, which is grasped and manipulated by the operator. The vehicle transmission housing is generally represented at 12 and includes an annular recess for receiving the annular bearing seat 14. A universal bearing 16 is welded to the lever 10 having a spherical segment surface concentric to the axis of the shift lever, and the bearing is maintained with respect to the shift lever by shoulder 18 and weldment 20.

The lowermost end of the shift lever 10 extends into the sleeve or tube 22 having a cylindrical bore 24 for receiving the end of the shift lever, and the sleeve includes openings 26 whereby the sleeve may be welded to the lever end at 28 such that the sleeve constitutes a rigid extension of the lever.

A stem 30 includes an upper region extending into the bore 24 of the sleeve, and the stem lower end 32 extends into a groove or recess 34 associated with the transmission gear displacing fork, hub or yoke 36 utilized to displace the transmission gearing for shifting purposes, as is well known.

A pivot pin 38 extends through the sleeve 22 and a diametrical bore received within the upper end of the stem 30, and the dimensions of the upper end of the stem are such that limited pivoting of the stem upper end within the sleeve bore 24 is permitted.

The upper end of the stem 30 includes a cylindrical portion 40 of a diameter less than the diameter of the sleeve bore, and at this control portion the stem is provided with the diametrical bore receiving the pivot pin 38. Annular recesses 42 are defined upon the stem upper end on opposite sides of the portion 40 and each receives an annular elastomeric ring 44 having an outer diameter which engages the sleeve bore 24. The sleeve upper end also includes an upper circular ridge 46 and a lower circular ridge 48 within the sleeve bore and of a diameter less than that of the sleeve bore.

In use, the prior art device of FIG. 1 transfers pivotal movement of the shift lever 10 about the fulcrum provided by the spherical bearing 16 to the lower end of the stem and thereby shifts the transmission gearing as desired. When no shifting or bending forces are being applied to the shift lever 10, or the stem 22, the contact of the elastomeric rings 44 with the bore of the sleeve 22 will coaxially align the stem with the sleeve, as shown, and there will be no metal-to-metal contact between the stem and sleeve except through the pivot pin 38 and the pin 38 is oriented such that the majority of vibrations are perpendicular to the pivot pin's length. Thus, the majority of the vibrations originating in the transmission and imposed upon the stem will not be transferred to the sleeve 22 and the shift lever 10 in view of the damping provided by the elastomeric rings 44. However, during shifting, the relatively high actuating forces applied to the shift lever can be directly transferred to the stem 30 in that pivoting of the stem about the pivot pin 38 will permit the ridges 46 and 48 to engage the sleeve bore 24 metal-to-metal as the rings 44 are compressed on one side due to such pivoting of the stem relative to the sleeve.

The prior art apparatus of FIG. 1 does reduce the transfer of vibrations from the transmission to the shifting lever. However, as the bearing 16 and the sleeve 22 are separate parts and require welding to the shift lever 10 this assembly is expensive, requiring special skills, and the possibility of mistakes occurring during assembly exists.

The apparatus of the invention is illustrated in FIGS. 2-6. In these figures of the drawing the vehicle shift lever is represented at 50 having an upper end which is manipulated by the vehicle operator and the lower end is of a cylindrical configuration terminating at 52. The lower end includes a diametrical bore 54 transverse to the shift lever axis.

The vehicle transmission 56 includes a recess, as in FIG. 1, for receiving bearing seat 58 and the transmission gear shifting yoke is represented at 60 including the recess 62 for receiving the lower end of the stem, as later described.

The vibration damper in accord with the invention consists of a single homogeneous body 64, FIG. 4, having a longitudinal axis coaxial with a cylindrical bore 66 extending therethrough which is of a uniform diameter throughout its length. The bore 66 intersects the body upper end 68 and the lower end 70. The body upper end is provided with a bulbous bearing surface 72 constituting a spherical segment for engaging the annular bearing seat 58 located in the transmission recess, FIG. 2, and the body is notched at 74 to hold its orientation to the transmission by guide keys, not shown.

The body 64 is provided with aligned diametrical bores 76 for receiving the pin 78, FIG. 2, and the pin 78 extends through the shift lever bore 54 and in this manner the vibration damper body 64 is firmly attached to the lower end of the shift rod without requiring welding or similar skilled secondary operations.

The lower end of the body 64 is of an exterior cylindrical configuration and includes a pair of diametrically aligned holes 80, FIG. 2, for receiving the stem pivot pin as later described.

The stem 82 includes an upper end region 84 and a lower end 86. The lower end 86 is of a configuration which will be appreciated from FIGS. 2, 3 and 6 and is received within the transmission shift fork recess 62 for transmitting the shift lever movements to the transmission gearing.

The upper end region of the stem 82 includes a central portion 88 of an enlarged diametrical configuration having the diametrical bore 90 extending therethrough. The pivot pin 92 is inserted through the bores 80 and 90 to pivotally assemble the stem 82 to the body 54.

Annular recesses 94 and 96 are defined above and below the central portion 88, and the axial dimension of the recess 94 is defined by the circular ridge 98 in an upward direction and the circular ridge 100 defines the end of recess 96 in the lower direction. It is to be noted that the ridges 98 and 100 are both within the confines of the body bore 66.

A pair of annular elastomeric vibration absorbing rings 102 are located within each recess 94 and 96. The rings are of a transverse rectangular cross-sectional configuration and the diameter of the outer circular periphery is substantially equal to, or slightly greater than, the diameter of the bore 66. Thus, the rings 102 will maintain the axis of the stem 82 coaxial with the shift lever axis under normal conditions, and as the diameters of the region 88 and the ridges 98 and 100 are less than the diameter of the bore 66 the rings will absorb those vibrations imposed upon the stem transverse to the axis of the pivot pin 92 without transferring the vibrations to the shift lever 50. During shifting, the rings 102 will compress permitting metal-to-metal engagement between the ridges 98 and 100 and the body bore 66 as illustrated in FIG. 3 wherein ridge 98 is engaging bore 66 at the left and ridge 100 is touching at the right.

The rings 102 are preferably formed of a thermal plastic material sold under the trademark Geolast, and have a durometer hardness of a range of 80-85 and a tensile strength of 1400 psi. The ultimate elongation is 325%, and 100% modulus of elasticity occurs at 725 psi. This material will remain stable at 280 degrees Fahrenheit for extended periods and will remain stable for short periods of time when subjected to temperatures of 350 degrees Fahrenheit for short durations.

Two elastomeric rings 102 are located within each associated recess 94 and 96 in order to provide a higher resistance to compression and to resist relative stem and body pivoting as compared to the embodiment of FIG. 1. This increase in the resistance of pivoting provides a better "feel" to the gear shifting characteristics without adversely affecting the vibration absorbing properties of the damper.

The axial dimension of the recesses 94 and 96 is greater than the sum of the axial dimensions of the two rings 102 located within each recess resulting in axial clearance between the rings themselves, and the associated recess. These clearances permit the elastomeric rings to axially expand during compression due to pivoting between the stem and body and prevents overstressing of the rings and provides uniform compression characteristics of the rings during operation.

As will be apparent from FIGS. 2 and 3 a shell 104 is located above the body 64 circumscribing the shift body end 68, and a compression spring 106 interposed between the shell and the end 68 imposes a downward biasing force on the shift rod to maintain the bearing surface 72 in engagement with the bearing seat 58. From the above description it will be appreciated that the transmission shift vibration damper of FIGS. 2-6 utilizing a single body mounted upon the lower end of the shifter rod, and utilizing a pair of rings in each recess and permitting assembly to the shifter rod by pins, eliminates welding and other high skilled assembly techniques and results in a damper having improved operating characteristics, an improved feel during gear shifting and simplified assembly procedures.

It is appreciated that various modifications to the disclosed embodiment may be apparent to those skilled in the art without departing from the spirit and scope of the invention.

We claim:

1. A vibration absorbing shift lever extension for power transmissions comprising, in combination, an elongated homogeneous body having an upper end and a lower end, a longitudinal axis and a coaxial bore extending from end to end being of a uniform cylindrical diametrical dimension throughout its length, a bulbous bearing surface defined upon said body upper end comprising a segment of a sphere, an elongated shift stem having an upper end region extending into said bore through said body lower end, a pivot pin mounted in said body lower end transverse to said axis and extending through said upper end region, said stem upper end region having a maximum diameter sufficiently less than the diameter of said body bore receiving said end region to permit limited pivoting of said stem end region relative to said body about said pivot pin, and resilient vibration damping means mounted on said stem upper end region interposed between said upper end region and said body bore absorbing and damping vibrations within said stem.

2. In a vibration absorbing shift lever extension as in claim 1, said stem upper end region being cylindrical having an upper portion located above said pivot pin and a lower portion located below said pivot pin, said upper portion terminating in a cylindrical first ridge and said lower portion terminating in a cylindrical second ridge, both of said ridges being within said body bore, an annular recess defined in each of said stem portions adjacent a ridge, said pivot pin extending through said stem upper end region intermediate said recesses, said resilient vibration damping means comprising a pair of elastomeric axially spaced rings located within and circumferentially radially extending from each of said recesses engaging said body bore, said ridges directly engaging said body bore on opposite sides thereof to limit pivoting between said body and said stem.

3. In a vibration absorbing shift lever extension as in claim 2, each of said elastomeric rings having a rectangular transverse cross section and having an outer cylindrical periphery engaging said body bore.

4. In a vibration absorbing shift lever extension as in claim 2, the axial dimension of said recesses being greater than the combined axial dimension of elastic rings received therein whereby axial clearance exists within said recesses to accommodate ring deformation during compression.

* * * * *